March 15, 1949.  H. P. SMITH  2,464,534
IMPLEMENT ATTACHING MEANS
Filed June 26, 1944
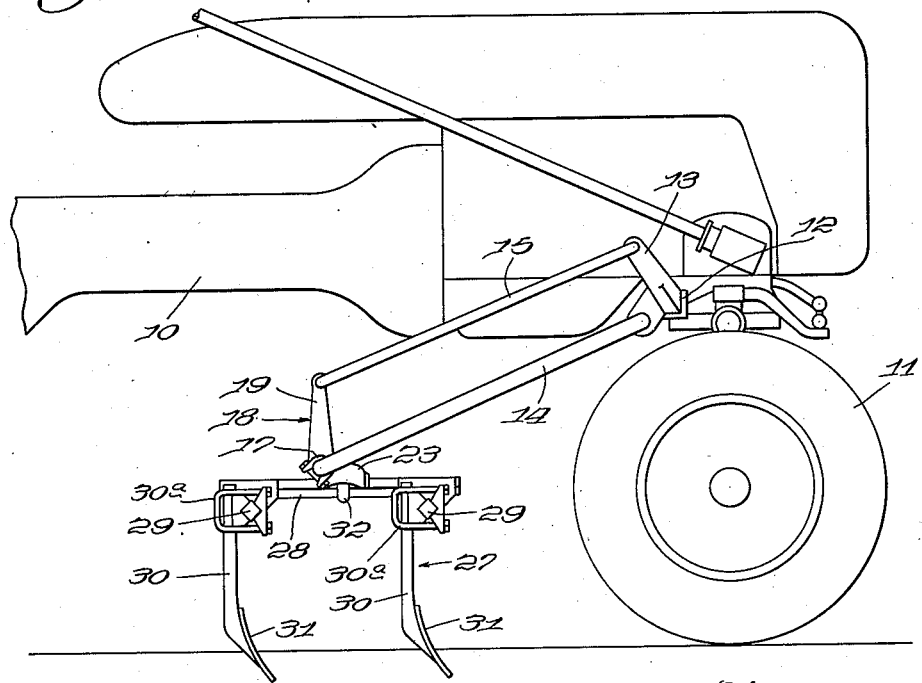
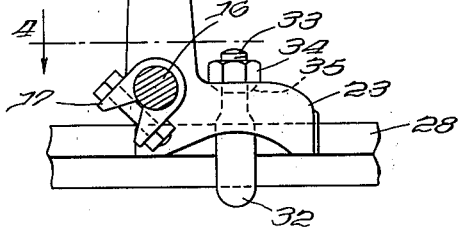
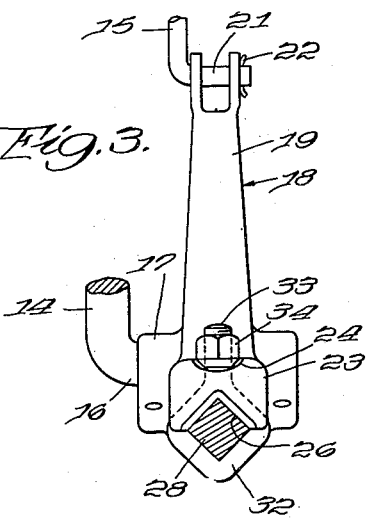
Inventor:
Hiram P. Smith.
By Paul O. Pippel
Atty.

Patented Mar. 15, 1949

2,464,534

UNITED STATES PATENT OFFICE 2,464,534

IMPLEMENT ATTACHING MEANS

Hiram P. Smith, Canton, Ill., assignor to International Harvester Company, a corporation of New Jersey Application June 26, 1944, Serial No. 542,116

3 Claims. (Cl. 97—197)

This invention relates to means for attaching agricultural implements to tractors and the like, and more particularly to an attaching structure carried by the tractor, serving for the attachment of a variety of working tools.

An object of the invention is to provide means for the quick attachment of implements to a tractor.

Another object of the invention is to provide for use with a tractor or the like, an attaching structure by which a variety of working tools may be quickly attached to the tractor to be carried thereby and as quickly detached therefrom to be replaced by other tools.

Other objects and advantages will become clear from the following detailed description when read in conjunction with the accompanying drawings, wherein:

Figure 1 is a view in side elevation of a tractor, showing the attaching structure of the present invention connected thereto;

Figure 2 is an enlarged detail in side elevation, partly in section, of a portion of the attaching structure shown in Figure 1;

Figure 3 is a front elevation, partly in section, of the structure shown in Figure 2; and Figure 4 is a section on the line 4 of Figure 2.

In the drawings, it will be noted that the numeral 10 designates the longitudinally extending body portion of a tractor having front wheels 11. Secured to the forward portion of the tractor and extending laterally from the side thereof is a transverse tool-bar 12 having affixed thereto a bracket 13. Bracket 13 serves for the pivotal mounting of the forward ends of vertically spaced, generally parallel links 14 and 15. These links extend rearwardly and downwardly, and the rear end of link 14 is provided with a bent transverse portion 16 for pivotal mounting in bearing 17 in a bracket 18. Bracket 18 has a vertically extending standard portion 19 having an opening 20 therein. The rear end of link 15 is provided with a transversely bent portion 21 pivotally received in the opening 20 and held against displacement by a cotter key 22.

Bracket 18 is provided with a right angled base portion 23 extending longitudinally of the tractor. As viewed particularly well in Figure 4, this base portion 23 is provided with a key-hole slot 24 having a countersunk restricted portion 25 therein. Likewise, as viewed in Figure 3, base portion 23 is provided with a longitudinally extending groove 26 extending the length thereof in the form of an inverted V.

Links 14 and 15 carrying the bracket 18 are adapted to be vertically moved about their pivots on the bracket 13 by suitable means, not shown.

Adapted to be attached to the bracket 18 to be moved therewith to and from earth-working position is a tool structure 27 including a longitudinally extending bar 28 of square cross-section adapted to fit within the V-shaped groove 26 in the base portion of bracket 18. Attached to the front and rear ends of tool-bar 28 are laterally extending bars 29 to which standards 30 are secured by brackets 30ª. The lower portions of standards 30 carry cultivator shovels 31.

Adapted to be secured about the tool-bar 28 is an eye-bolt 32 having a threaded shank 33 extending upwardly therefrom. Shank 33 is provided with an adjustable nut 34 having a tapered portion 35. Upon seating of the tool-bar 28 in the groove 26, shank 33 with the nut 34 thereon projects upwardly through the enlarged portion of key-hole slot 24. Bar 28 is then moved axially until the shank 33 is in registry with the retricted countersunk portion 25. Nut 34 is then tightened until it becomes seated in the countersunk portion 25, whereupon the tool structure 27 is securely fastened to the bracket 18 and held against longitudinal displacement therefrom.

It is readily understood that by use of this attaching structure a variety of working tools may be quickly attached to the tractor to be carried thereby. While in the drawings a cultivator gang 27 is shown, it will be clear that planters or other equipment may be substituted therefor. In order to remove the tool-bar 28 and the working tools carried thereby, the nut 34 is simply loosened and the tool-bar 28 displaced until the nut 34 is in registry with the enlarged portion of the key-hole slot, whereupon it is readily withdrawn and similarly replaced by other implements.

Having now described the invention in its preferred form, it should be understood that variations may be made therein without departing from the spirit of the invention or the scope of the appended claims.

What is claimed is:

1. In a frame structure for mounting agricultural implements upon a tractor, supporting means on the tractor, vertically spaced generally parallel links pivoted on the supporting means for vertical movement, a bracket pivotally mounting the free ends of said links, said bracket having an upstanding portion and a base portion extending generally at right angles thereto, a V-shaped groove in the under surface of said base portion extending longitudinally thereof to receive a tool-carrying bar of square cross-section, an eye-bolt adapted to receive said bar, said eyebolt having a threaded shank portion and a tapered nut, and a key-hole slot formed in said base portion adapted to receive the shank of said bolt and a countersink in the restricted end of said slot to seat said nut.

2. In a frame structure for mounting agricultural implements upon a tractor, supporting means on the tractor, vertically spaced generally parallel links pivoted on the supporting means for vertical movement, a bracket pivotally mounting the free ends of said links, said bracket having an upstanding portion and a base portion extending generally at right angles thereto, a groove in the under surface of said base portion extending longitudinally thereof to receive a tool-carrying bar, bolt means secured to said bar, a key-hole slot formed in said base portion having a countersink in its restricted end, and fastening means on said bolt cooperating with the countersink in said slot to hold said bar in said groove and prevent relative movement of said bar and said bracket.

3. In a frame structure for mounting agricultural implements upon a tractor, supporting means on the tractor, linkage pivoted on the supporting means for vertical movement, a bracket carried by said linkage and pivotally supporting the free end thereof, said bracket having a vertically extending portion and a base portion extending generally at right angles thereto, a groove in the under surface of said base portion extending longitudinally thereof to receive a tool-carrying bar, a bolt secured to said bar having a threaded shank, a keyhole slot formed in said base portion and having a countersink at its restricted end, and a tapered nut adjustable on said shank and adapted to be seated in the countersink in said slot to hold said bar in said groove and prevent relative movement of said bar and said bracket.

HIRAM P. SMITH.

REFERENCES CITED

The following references are of record in the file of this patent:

UNITED STATES PATENTS

| Number | Name | Date |
|---|---|---|
| 724,005 | Hall | Mar. 31, 1903 |
| 2,239,387 | Johnson | Apr. 22, 1941 |
| 2,259,890 | Hipple | Oct. 21, 1941 |
| 2,341,804 | Mott et al. | Feb. 15, 1944 |